(12) United States Patent
Lütke-Bexten et al.

(10) Patent No.: US 8,152,210 B2
(45) Date of Patent: Apr. 10, 2012

(54) BUMPER

(75) Inventors: Ulrich Lütke-Bexten, Paderborn (DE);
Michael Roll, Bielefeld (DE); Elmar Mollemeier, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 145 days.

(21) Appl. No.: 12/627,467

(22) Filed: Nov. 30, 2009

(65) Prior Publication Data
US 2010/0133861 A1 Jun. 3, 2010

(30) Foreign Application Priority Data

Dec. 1, 2008 (DE) .......................... 10 2008 059 748

(51) Int. Cl.
*B60R 19/04* (2006.01)
(52) U.S. Cl. ...................................... 293/102; 293/120
(58) Field of Classification Search .................. 293/102, 293/118–120, 146–148, 150, 152, 153, 155
See application file for complete search history.

(56) References Cited

U.S. PATENT DOCUMENTS

| | | | | |
|---|---|---|---|---|
| 1,224,817 A * | 5/1917 | Westover | ....................... | 293/150 |
| 1,705,119 A * | 3/1929 | Jacobs | ........................... | 293/150 |
| 2,672,363 A * | 3/1954 | Buchanan | ...................... | 293/118 |
| 3,907,352 A * | 9/1975 | Spain et al. | .................... | 293/152 |
| 4,225,167 A * | 9/1980 | Buettner et al. | .............. | 293/120 |
| 5,000,499 A * | 3/1991 | Shephard et al. | ............. | 293/150 |
| 5,042,858 A * | 8/1991 | Schubert et al. | ................ | 293/24 |
| 5,407,239 A * | 4/1995 | Arai et al. | ..................... | 293/146 |
| 6,349,521 B1 | 2/2002 | McKeon | | |
| 6,439,650 B2 * | 8/2002 | Artner et al. | ............. | 296/187.03 |
| 6,481,690 B2 * | 11/2002 | Kariatsumari et al. | ....... | 293/155 |
| 6,779,821 B2 * | 8/2004 | Hallergren | ..................... | 293/133 |
| 6,971,691 B1 * | 12/2005 | Heatherington et al. | ..... | 293/102 |
| 6,971,692 B2 * | 12/2005 | Gioia et al. | .................... | 293/120 |
| 6,986,536 B1 * | 1/2006 | Heatherington et al. | ..... | 293/102 |
| 7,025,396 B2 * | 4/2006 | Omura et al. | ................. | 293/102 |
| 7,097,222 B2 * | 8/2006 | Ran | ................. | 293/137 |
| 7,407,219 B2 * | 8/2008 | Glasgow et al. | ......... | 296/187.03 |
| 7,478,849 B2 * | 1/2009 | Fortin | ........................ | 293/120 |
| 7,537,252 B2 * | 5/2009 | Nagai et al. | .................... | 293/102 |
| 7,611,175 B2 * | 11/2009 | Tornberg | ..................... | 293/102 |
| 7,665,778 B2 * | 2/2010 | Henseleit | ...................... | 293/102 |
| 7,931,315 B2 * | 4/2011 | Hori et al. | ..................... | 293/102 |
| 2003/0155806 A1 * | 8/2003 | Goto et al. | .................... | 301/120 |
| 2005/0285416 A1 * | 12/2005 | Heatherington et al. | ..... | 293/102 |
| 2010/0109354 A1 * | 5/2010 | Agrahari et al. | .............. | 293/102 |
| 2010/0133861 A1 * | 6/2010 | Lutke-Bexten et al. | ...... | 293/120 |

FOREIGN PATENT DOCUMENTS

| | | |
|---|---|---|
| DE | 198 53 128 | 5/2000 |
| DE | 102004055518 | 5/2006 |
| DE | 102005024094 | 11/2006 |
| DE | 102007001966 | 7/2008 |
| EP | 1 182 095 | 8/2000 |
| EP | 1 495 917 | 1/2005 |
| WO | WO 2005/054011 | 6/2005 |

* cited by examiner

*Primary Examiner* — Glenn Dayoan
*Assistant Examiner* — Gregory Blankenship
(74) *Attorney, Agent, or Firm* — Henry M. Feiereisen; Ursula B. Day

(57) ABSTRACT

A bumper for a motor vehicle includes a lightweight cross member attachable transversely to the longitudinal rails of the motor vehicle frame. The cross member includes two longitudinal profiles which are displaceable relative to each other and support each other during the displacement. The bumper provides improved functionality and increased energy absorption capability.

36 Claims, 6 Drawing Sheets

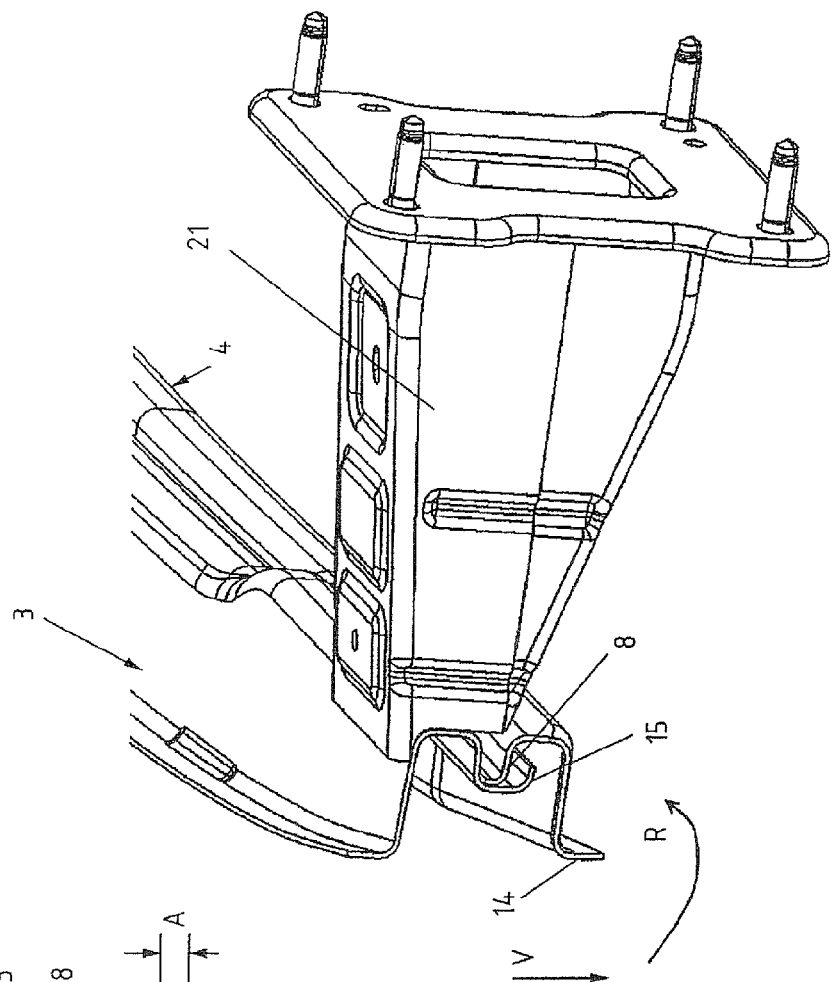
Fig. 4
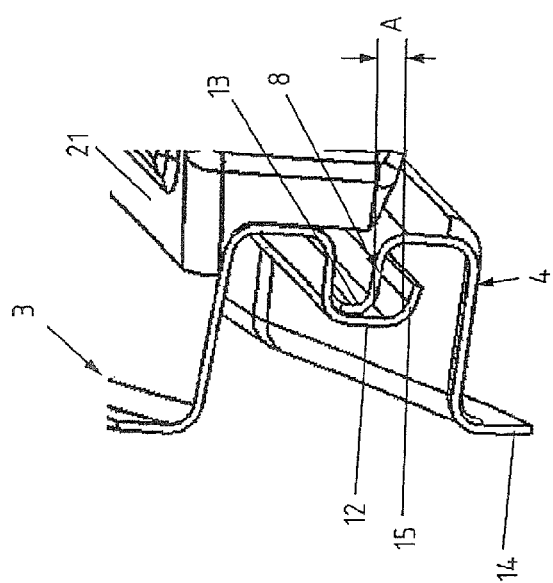
Fig. 5
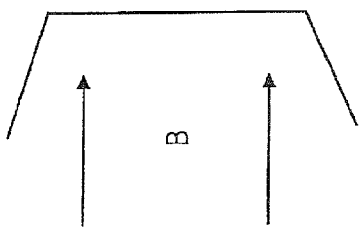

BUMPER

CROSS-REFERENCES TO RELATED APPLICATIONS

This application claims the priority of German Patent Application, Serial No. 10 2008 059 748.1, filed Dec. 1, 2008, pursuant to 35 U.S.C. 119(a)-(d), the contents of which are incorporated herein by reference in its entirety as if fully set forth herein

BACKGROUND OF THE INVENTION

The invention relates to a bumper for a motor vehicle.

Bumpers are commonly installed on the front and on the rear of motor vehicles to absorb the impact energy caused by small impacts, thereby minimizing damage to the actual support structure of the motor vehicle. A bumper is typically constructed of a cross member which can be attached to the longitudinal rails of the motor vehicle frame by incorporating crash boxes. The cross member operates to transmit the energy resulting from an impact into the crash boxes, where the impact energy is converted into deformation energy. The system is matched by locating the crash boxes as close to the center of longitudinal rail of the motor vehicle as possible, wherein the impact energy is transmitted via the cross member into the crash boxes and hence into the longitudinal rails with minimum bending moment.

Various bumpers of different designs are known in the art. For example, U.S. Pat. No. 6,349,521 B1 discloses a conventional bumper with a rigid cross member configured as a hollow support. The cross-section varies over the length of the cross member in order to provide the cross member with a high energy absorption capability commensurate with the load.

EP 1 730 002 B1 discloses a bumper with a cross member having a U-shaped longitudinal profile that is closed off with a cover plate. The cross member known from EP 1 182 095 B1 is constructed from an upper shell and a lower shell which face one another and are connected at front faces of front legs along overlapping longitudinal sections.

EP 1 495 917 B1 discloses a bumper with a cross member having a lower section and an upper section, wherein the upper section protrudes outwardly with respect to the lower section and includes a shock absorber. The lower section is stiffened by a reinforcement element. Additional examples of bumpers and/or bumper systems are given in DE 10 2007 001 966 A1 or DE 10 2004 055 518 A1.

In addition to the regulatory requirements which are part of the type approval in Europe, consumer protection agencies, such as Euro-NCAP, also evaluate on new vehicles the protection of pedestrians. In addition, the requirements stipulated by the insurers' classification test (Research Council for Automobile Repairs (RCAR), Gesamtverband der deutschen Versicherungswirtschaft (German Insurance Association) (GDV)) must also be met. Automobile manufacturers typically also demand optimal utilization of the installation space, ease of installation, high energy absorption capability as well as lowest possible weight and acceptable costs.

The current discussion of reducing $CO_2$-emission in the automobile industry requires a consequent implementation of lightweight construction in vehicle development. However, the required weight reduction and the insurance classification tests contradict one another. In these tests, collisions of the bumpers or bumper systems with barriers are performed at different speeds. Cross members designed for RCAR/GDV tests are frequently 20-30% heavier than conventional systems, because minimum geometric requirements are set and the supports must have substantial height to meet the test requirements. Nonetheless, overriding or underriding a barrier can frequently not be prevented at all or only with great difficulty, depending on the vehicle type, in spite of the minimum geometric requirements. The design of the vehicle frequently also prevents an optimal configuration of the cross member.

Based on the state of the art, it is therefore an object of the invention to improve the functionality of a lightweight bumper and to increase its energy absorption capability in the overall concept of a bumper system.

SUMMARY OF THE INVENTION

According to the invention, the cross member includes two longitudinal profiles which can be displaced relative to one another and which support one another during displacement. In this way, the bumper can adapt itself to the load characteristics in a crash, in particular through enlargement of the entire front impact surface, i.e., the surface facing outward from the motor vehicle. Each longitudinal profile has, as viewed in the vertical direction, an outer free end section, with the free end sections of the longitudinal profiles moving away from each other during the displacement. Advantageously, the longitudinal profiles overlap in certain regions and interlock with each other.

Preferably, the longitudinal profiles have a web and legs connected thereto, wherein particularly the legs can have different lengths.

Flanges are connected to the end portions of the legs. A marginal web facing the web is connected to at least one flange.

At least one longitudinal profile has a profile section with an S-shaped cross section. Moreover, at least one longitudinal profile may have a profile section with a U-shaped cross section. The U-shaped profile section can also be part of the S-shaped profile section. The S-shaped profile section is hereby constructed from the legs with connected flanges and a marginal web adjoining a flange.

The longitudinal profiles are arranged for relative rotation and/or vertical displacement. The leg of a longitudinal profile together with its flange and the marginal web hereby encompasses the leg of the second longitudinal profile. In the event of an impact, the two longitudinal profiles catch one another and support one another in certain regions. The reaction of the bumper can thereby be flexibly adapted to different types of barriers.

The bumper of the invention meets the minimum geometric requirements of the actual test procedures/design specifications. In addition, functional requirements can be met. In particular, it can be expected that during the insurance classification test, for example the RCAR bumper test, the barrier will likely not be overridden or underridden, because the lower longitudinal profile can flexibly react to a low barrier.

The bumper of the invention is optimized with respect to a crash and weight and requires only a small installation space. The load characteristics can also be optimized by employing high-strength steel. The profile can also be constructed from different materials or materials having different rigidity and ductility. Preferably, the longitudinal profiles are made of hot-formed and/or cold-formed high-strength steels.

The longitudinal profiles can also have different wall thicknesses. The longitudinal profiles can have along their length variable wall thickness and cross-sectional shape.

The ends of the two longitudinal profiles forming the cross member are each connected and joined to the end faces of a crash box. In particular, joining is performed by welding.

Patterning the longitudinal profiles of the cross member of the bumper ensures excellent energy absorption by the bumper even with small wall thicknesses. Dividing the cross member into two longitudinal profiles increases the flexibility of the bumper when the bumper hits different barriers due to the fact that in an impact, one longitudinal profile can be displaced and rotated relative to the other longitudinal profile.

BRIEF DESCRIPTION OF THE DRAWING

Exemplary embodiments of the invention will now be described with reference to the appended drawings.

FIG. 4 shows attachment of an end of a bumper to a crash box;

FIG. 5 shows an enlarged portion of the attachment of FIG. 4;

DETAILED DESCRIPTION OF PREFERRED EMBODIMENTS

Figure 1:
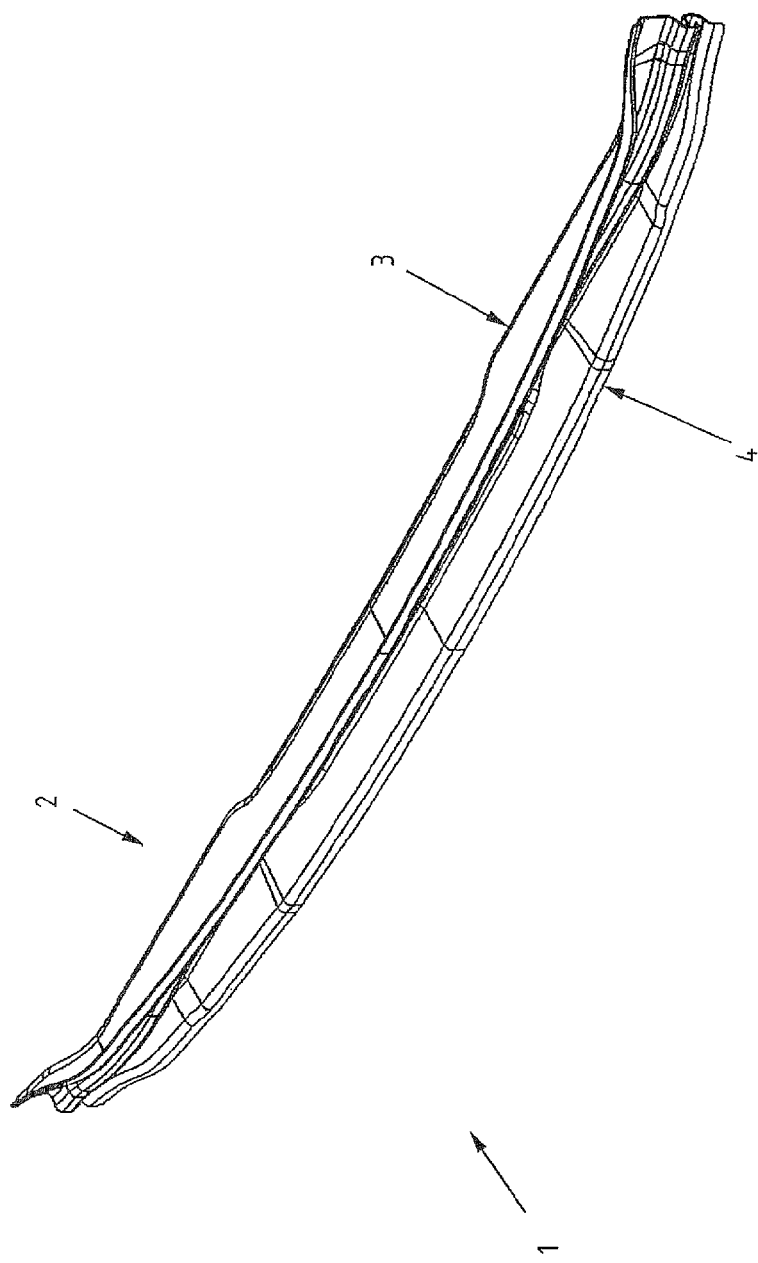
FIG. 1 shows a perspective front view of a bumper.

FIG. 1 shows a bumper 1 viewed towards the front side facing away from the motor vehicle. For the sake of clarity, only one cross member 2 of the bumper 1 is illustrated. The cross member 2 is divided into two interlocking longitudinal profiles 3, 4, as will be described below.

Figure 2:
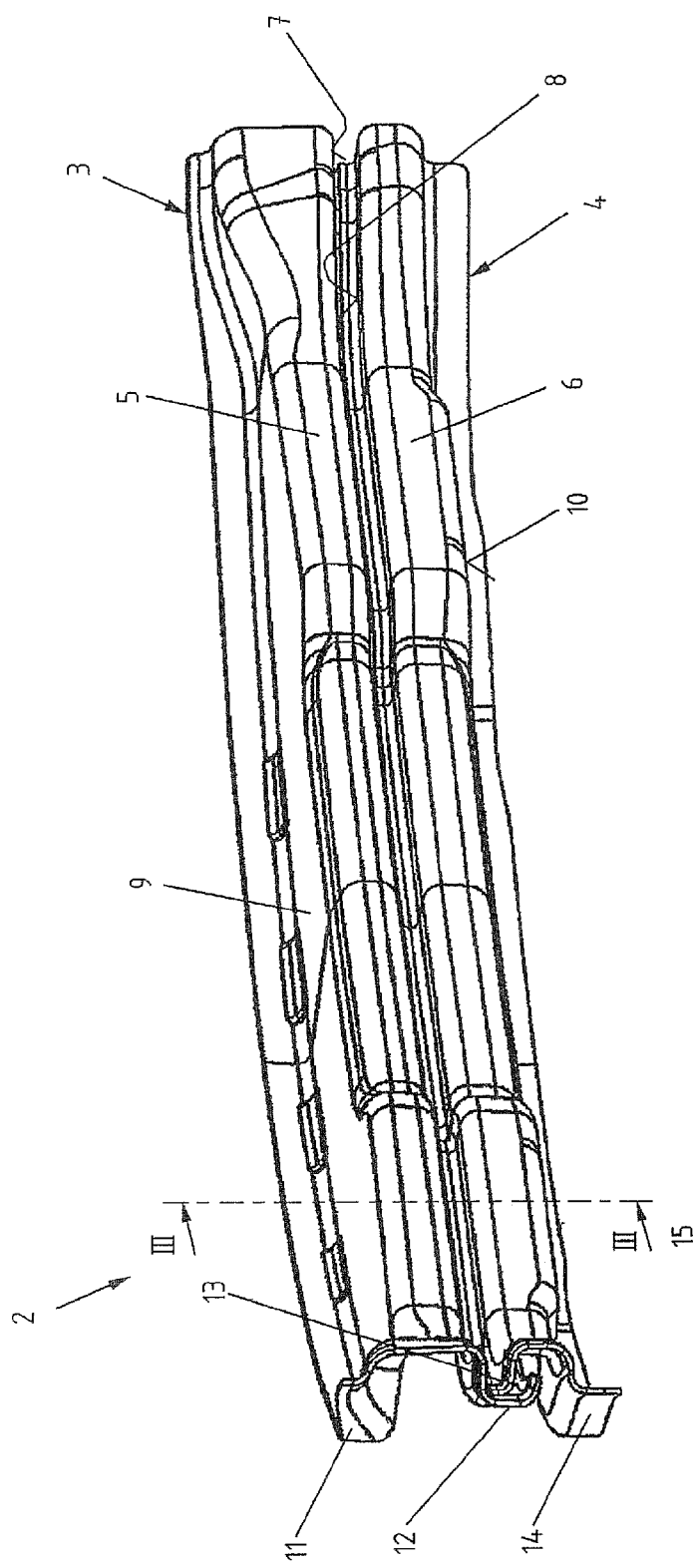
FIG. 2 shows a rear view of a bumper section.
Figure 3:
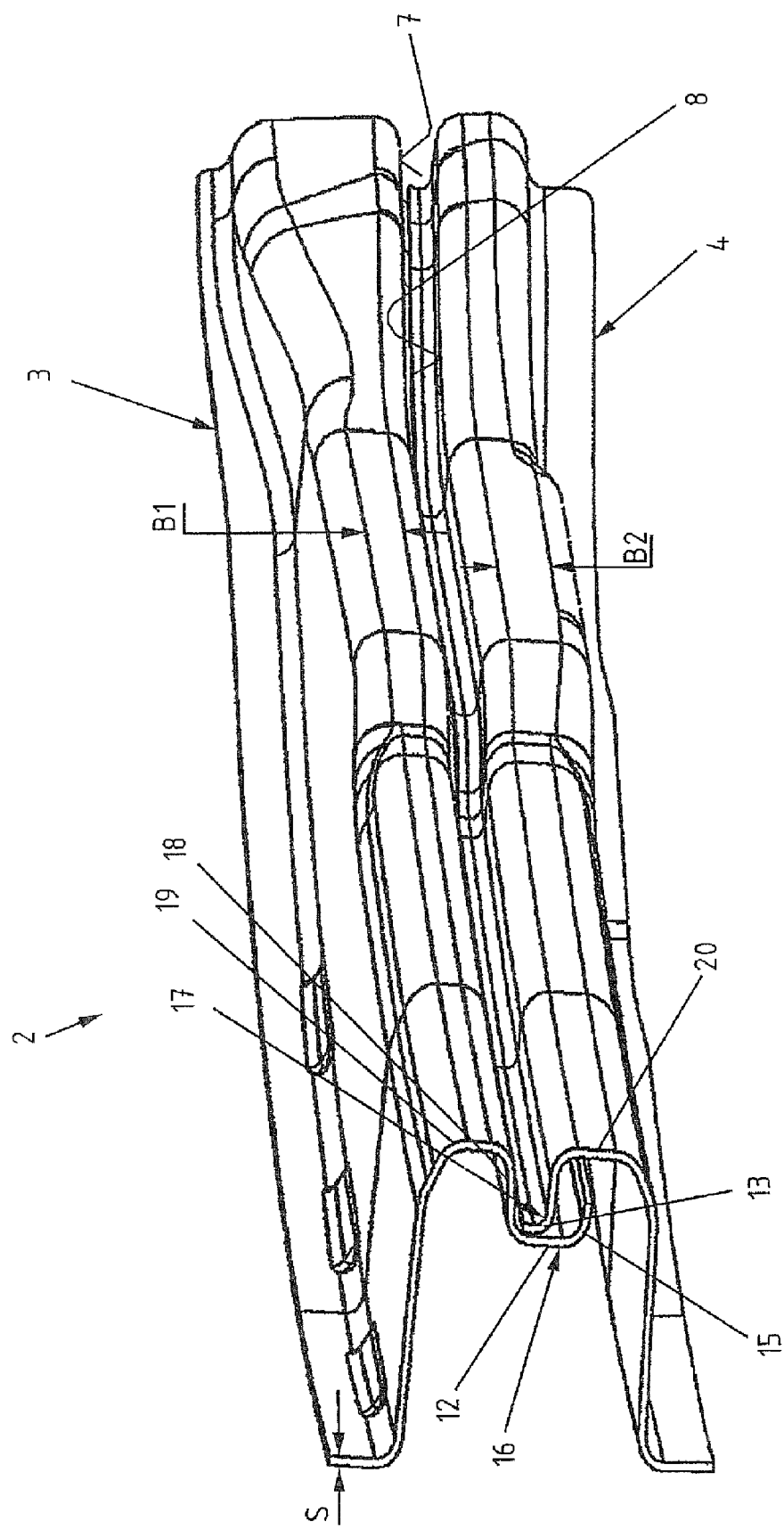
FIG. 3 shows a detail of the rear view of the bumper of FIG. 2 in a perspective view taken along the sectional plane III-III.

FIG. 2 shows a portion of the cross member 2 viewed towards the rear side facing the motor vehicle. The two longitudinal profiles 3, 4 have a different configuration along their longitudinal extent. However, FIGS. 2 and 3 illustrate clearly that both longitudinal profiles 3, 4 interlock with one another in a specific manner. Each of the upper longitudinal profile 3 and the lower longitudinal profile 4 has a corresponding rear web 5, 6, from which respective legs 7, 8, 9, 10 extend towards the front side of the cross member 2. The depths of the legs 7, 8, 9, 10 measured in the horizontal direction may be different. The depth/length of the legs 7, 8, 9, 10 can hence vary, depending on where a sectional plane through the cross member 2 is located. Flanges 11, 12, 13, 14 connected to the substantially horizontal legs 7, 8, 9, 10, wherein the flanges 11, 12, 13, 14 are bent in relation to the legs 7, 8, 9, 10. Additional bends can be provided by connecting to at least one flange 12 a marginal web 15 facing the web 5. This produces a shape with an S-shaped cross-section.

FIG. 3 illustrates a detail of the cross member 2 shown in FIG. 2. Shown in cross-section is the interlock or overlap of end sections 16, 17 of the longitudinal profiles 3, 4. The lower end section 16 of the upper longitudinal profile 3, in relation to the drawing plane, engages with the upper end section 17 of the lower longitudinal profile 4, also in relation to the drawing plane. The lower end section 16 of the longitudinal profile 3 is formed by the substantially U-shaped structure, which is open at the rear and formed by the lower leg 7, the adjoining flange 12, and the marginal web 15 facing the web 5. Likewise, the end section 17 of the lower longitudinal profile 4 is formed by the upper leg 8 and the adjoining flange 13.

In the illustrated embodiment, the upper longitudinal profile 3 has a profile section 18 with an S-shaped cross-section, which now inevitably has two bulges, with one bulge being open to the front side and the other to the backside of the cross member 2. The upper U-shaped profile section, in relation to the drawing plane, is indicated with the reference symbol 19. The lower longitudinal profile has likewise a U-shaped profile section 20 which is open to the front side.

The end section 16 of the upper longitudinal profile 3 and of the upper end section 17 of the lower longitudinal profile 4 interlock by way of overlap of the leg 8 of the lower longitudinal profile 4 with the marginal web 15 of the upper longitudinal profile 3.

The cross-section of the longitudinal profiles 3, 4 can vary along the length of the cross member 2. In this example, the width B1, B2 of the webs 5, 6 varies. However, the wall thickness S of the longitudinal profile 3, 4 may also vary.

Figure 6:
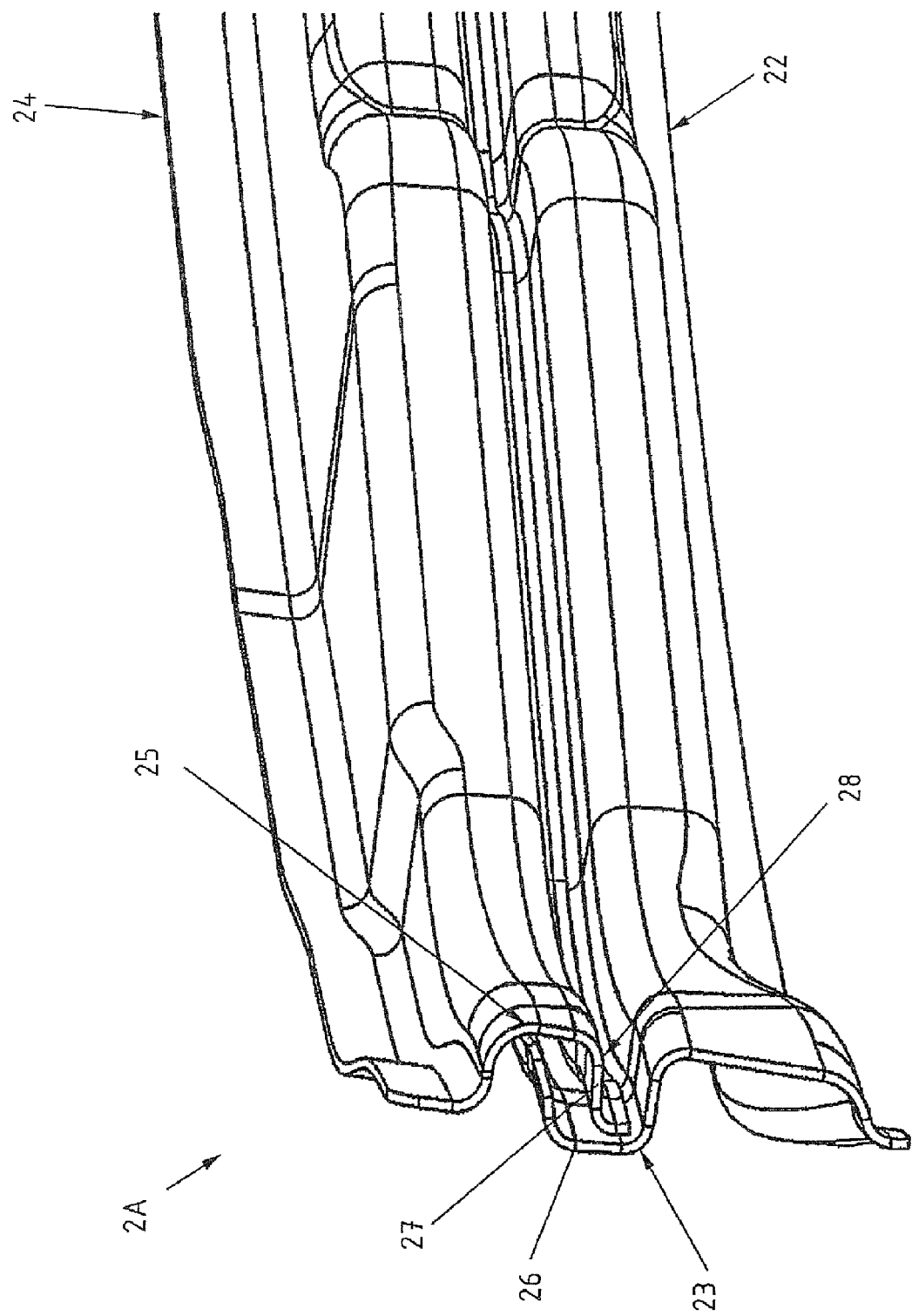
FIG. 6 shows another exemplary embodiment of a bumper in a rear view.

FIGS. 5 and 6 show the connection between an end of a cross member and a crash box 21. Preferably, the longitudinal profiles 3, 4 of the cross member 2 are welded to the crash box 21. The lower longitudinal profile 4 is arranged so as to be displaceable in the vertical direction V relative to the upper longitudinal profile 3 in the event of an impact, and to simultaneously perform a rotational motion R relative to the upper longitudinal profile 3. In the event of an impact, the entire impact surface area increases by the distance A (FIG. 5) of the displacement V, depending on the length of the flange 12 which encompasses the leg 8 of the lower longitudinal profile 4 and depending on the length of the flange 13 which is connected to the leg 8. Should the motor vehicle hit a barrier B only with the impact surface of the flange 14 of the lower longitudinal profile 4, then the lower longitudinal profile 4 performs a rotation R about the flange 13 after or during the displacement V. The web 8 with the flange 13 of the lower longitudinal profile 4 and the marginal web 15 with the flange 12 are here paired similar to a prismatic swivel joint, which adapts the cross member better to different impact conditions. This situation can be improved by selecting for the longitudinal profile, for example, materials with soft torsion or high flexibility.

FIG. 6 shows an alternative embodiment of a cross member 2A. The lower longitudinal profile 22 has here a profile section 23 with an S-shaped cross-section, whereas the upper longitudinal profile 24 has a profile section 25 with a U-shaped cross-section. The upper end section 26 of the lower longitudinal profile 22 encompasses the front side of the leg 27 of the end section 28 of the upper longitudinal profile 24. This represents approximately the inverse variant of a FIG. 1.

Figure 7:
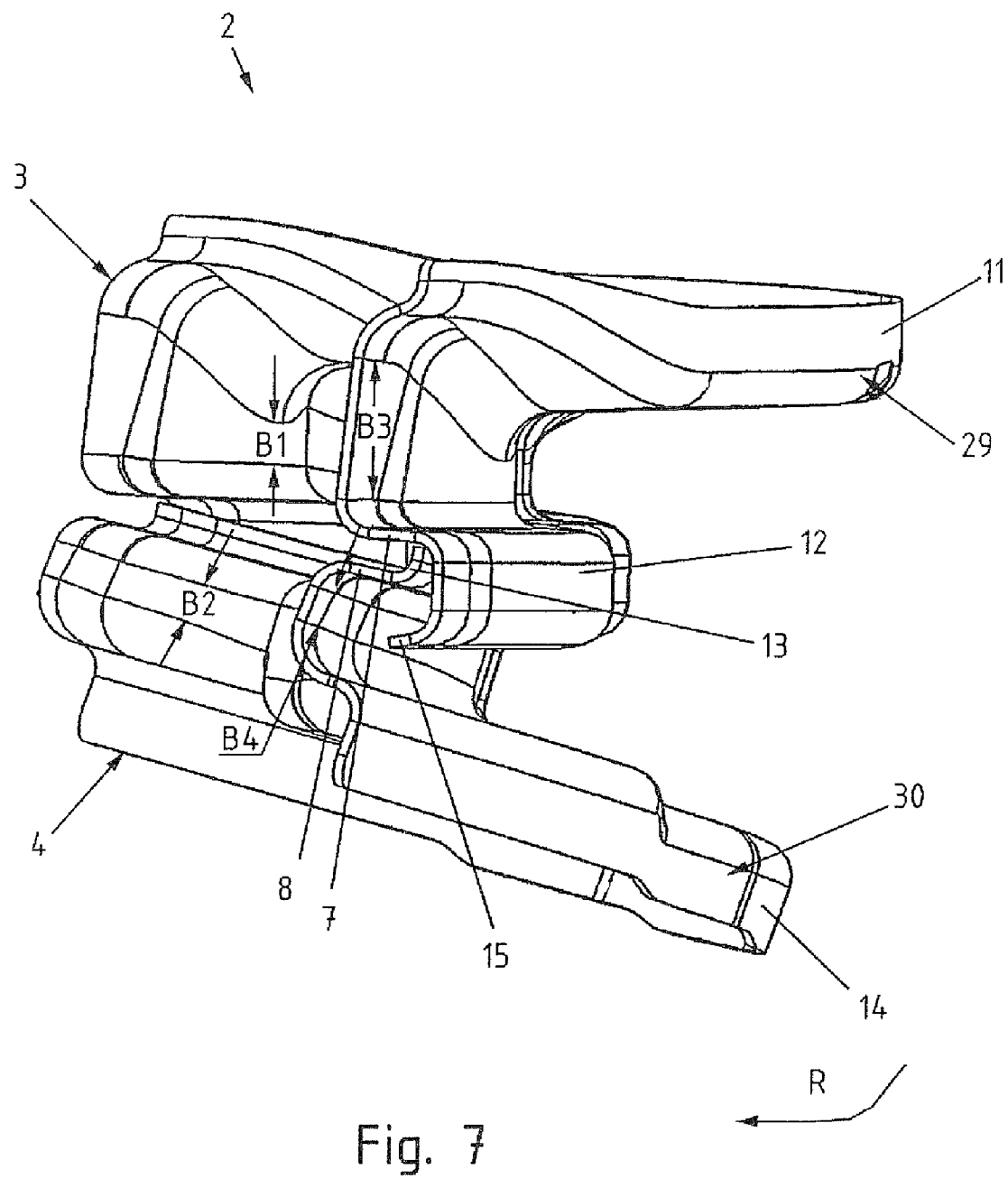
FIG. 7 shows a perspective side view of a cross member of FIG. 1.

FIG. 7 shows a side view of a cross member 2. The lower longitudinal profile 4 is here shown as being twisted with respect to the upper longitudinal profile 3. The upper longitudinal profile 3 encompasses with the marginal web 15, which is connected to the flange 12 of web 7, the leg 8 with the flange 13 of the lower longitudinal profile 4 from the front. The respective outer flanges 11, 14 of the upper longitudinal profile 3 and the lower longitudinal profile 4 function as impact surface. During a rotation R of the lower longitudinal profile 4 relative to the upper longitudinal profile 3, the outer end sections 20 9, 30 with the associated flanges 11, 14 and their respective impact surfaces move away from one another; the cross member is effectively spread apart.

FIG. 7 also indicates by how much the width of the webs can vary. The width B1, B3 of the web 5 of the upper longitudinal profile 3 increases in certain regions by at least a factor of 2, whereas the width B2, B4 of the web 6 of the lower longitudinal profile 4 changes to a lesser degree in the same region.

What is claimed is:

1. A bumper for a motor vehicle having a motor vehicle frame and longitudinal rails, the bumper comprising a cross member having a length and being configured for transverse attachment to the longitudinal rails, the cross member including a longitudinal lower profile and a longitudinal upper profile, wherein the lower profile and upper profile engage with one another along a longitudinal center line of the cross member along substantially the entire length of the cross member and are displaceable relative to each other and support each other during displacement.

2. The bumper of claim 1, wherein the longitudinal profiles are constructed for rotation relative to each other.

3. The bumper of claim 1, wherein the longitudinal profiles are constructed for vertical displacement relative to each other.

4. The bumper of claim 1, wherein each longitudinal profile comprises an outer free end section, with the corresponding free end sections moving away from each other during the displacement.

5. The bumper of claim 1, wherein the longitudinal profiles have overlapping regions and interlock with each other.

6. The bumper of claim 1, wherein at least one longitudinal profile has a profile section constructed with an S-shaped cross section.

7. The bumper of claim 1, wherein at least one longitudinal profile has a profile section constructed with a U-shaped cross section.

8. The bumper of claim 1, wherein each longitudinal profile comprises a first web and two legs connected to the first web.

9. The bumper of claim 8, wherein the two legs have different lengths.

10. The bumper of claim 8, further comprising flanges connected to end portions of the two legs in one-to-one correspondence.

11. The bumper of claim 10, further comprising a marginal web oriented towards the first web and connected to at least one of the flanges.

12. The bumper of claim 1, wherein the longitudinal profiles are made of different materials.

13. The bumper of claim 1, wherein the longitudinal profiles have walls with different wall thicknesses.

14. The bumper of claim 1, wherein the longitudinal profiles have ends that are joined to a crash box.

15. A bumper for a motor vehicle having a motor vehicle frame and longitudinal rails, the bumper comprising a cross member configured for transverse attachment to the longitudinal rails, the cross member including two longitudinal profiles which are displaceable relative to each other and support each other during displacement, wherein the longitudinal profiles are constructed for vertical displacement relative to each other.

16. The bumper of claim 15, wherein the longitudinal profiles have overlapping regions and interlock with each other.

17. The bumper of claim 15, wherein at least one longitudinal profile has a profile section constructed with an S-shaped cross section.

18. The bumper of claim 15, wherein at least one longitudinal profile has a profile section constructed with a U-shaped cross section.

19. The bumper of claim 15, wherein each longitudinal profile comprises a first web and two legs connected to the first web.

20. The bumper of claim 19, wherein the two legs have different lengths.

21. The bumper of claim 19, further comprising flanges connected to end portions of the two legs in one-to-one correspondence.

22. The bumper of claim 21, further comprising a marginal web oriented towards the first web and connected to at least one of the flanges.

23. The bumper of claim 15, wherein the longitudinal profiles are made of different materials.

24. The bumper of claim 15, wherein the longitudinal profiles have walls with different wall thicknesses.

25. The bumper of claim 15, wherein the longitudinal profiles have ends that are joined to a crash box.

26. A bumper for a motor vehicle having a motor vehicle frame and longitudinal rails, the bumper comprising a cross member configured for transverse attachment to the longitudinal rails, the cross member including two longitudinal profiles which are displaceable relative to each other and support each other during displacement, wherein each longitudinal profile comprises an outer free end section, with the corresponding free end sections moving away from each other during the displacement.

27. The bumper of claim 26, wherein the longitudinal profiles have overlapping regions and interlock with each other.

28. The bumper of claim 26, wherein at least one longitudinal profile has a profile section constructed with an S-shaped cross section.

29. The bumper of claim 26, wherein at least one longitudinal profile has a profile section constructed with a U-shaped cross section.

30. The bumper of claim 26, wherein each longitudinal profile comprises a first web and two legs connected to the first web.

31. The bumper of claim 30, wherein the two legs have different lengths.

32. The bumper of claim 30, further comprising flanges connected to end portions of the two legs in one-to-one correspondence.

33. The bumper of claim 32, further comprising a marginal web oriented towards the first web and connected to at least one of the flanges.

34. The bumper of claim 26, wherein the longitudinal profiles are made of different materials.

35. The bumper of claim 26, wherein the longitudinal profiles have walls with different wall thicknesses.

36. The bumper of claim 26, wherein the longitudinal profiles have ends that are joined to a crash box.

* * * * *